J. J. LYNN.
FOLDABLE FLY TRAP.
APPLICATION FILED APR. 26, 1917.

1,238,539.

Patented Aug. 28, 1917.

Inventor
Joseph J. Lynn

By *Lancaster and Allwein*
Attorneys

UNITED STATES PATENT OFFICE.

JOSEPH JAMES LYNN, OF MOOSE JAW, SASKATCHEWAN, CANADA.

FOLDABLE FLY-TRAP.

1,238,539.  Specification of Letters Patent.  Patented Aug. 28, 1917.

Application filed April 26, 1917. Serial No. 164,754.

*To all whom it may concern:*

Be it known that I, JOSEPH J. LYNN, a subject of the King of Great Britain, and a resident of Moose Jaw, in the Province of Saskatchewan and Dominion of Canada, have invented a certain new and useful Improvement in Foldable Fly-Traps, of which the following is a specification.

The present invention relates to fly traps, and has for an object to provide a trap which may be easily folded or knocked down into compact form for transportation and storage.

Another object of the present invention is to provide a fly trap with a base which is relatively large and having posts or prongs adapted to engage in the ground to anchor the fly trap thereto and to hold the fly trap against accidental tilting.

The invention comprises, broadly, a fly trap provided with a body having a removable cover and a sectional base which may be constructed from sheet metal or the like and which may be readily knocked down and placed within the body, the base being provided with a bait support adapted to be arranged beneath the body and adjacent to the entrance of the trap.

The above, and various other objects and advantages of this invention will be in part described and in part understood, from the following detailed description of the present preferred embodiment, the same being illustrated in the accompanying drawing wherein.

Figure 1:
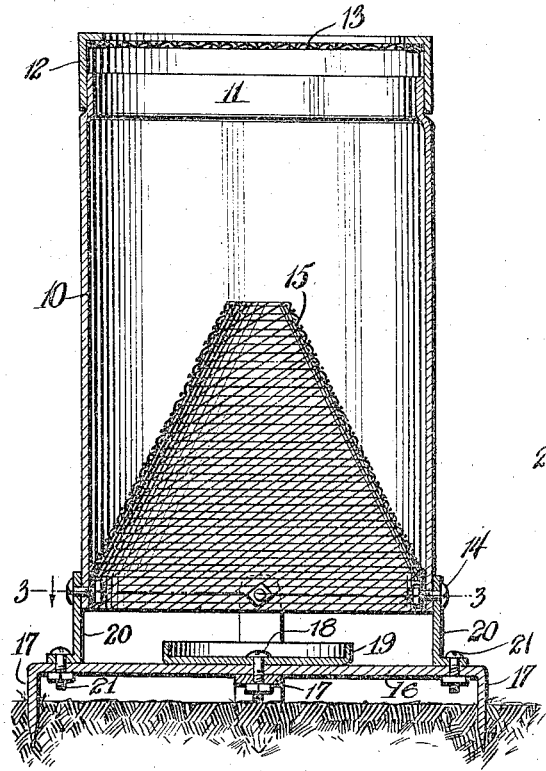
Figure 1 is a vertical section taken through a trap constructed according to the present invention, the trap being set up for use.
Figure 2:
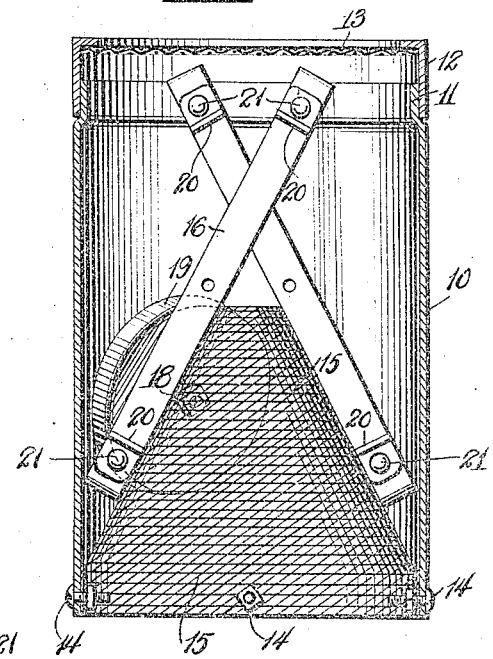
Fig. 2 is a similar view disclosing the base of the trap knocked down and packed within the body.
Figure 3:
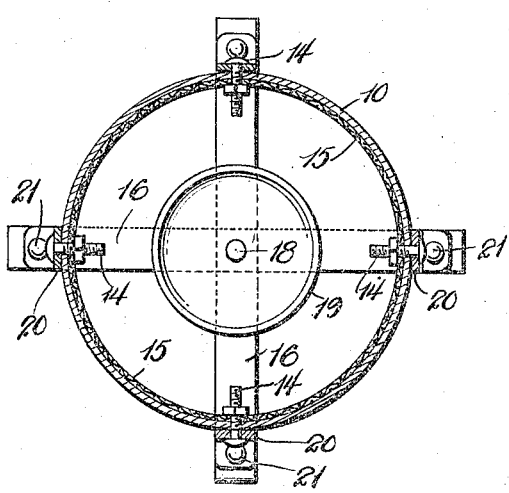
Fig. 3 is a horizontal section taken through the lower end of the trap substantially on the line 3—3 of Fig. 1.
Figure 4:
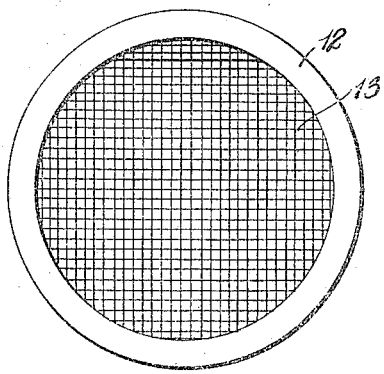
Fig. 4 is a top plan view of the cover of the trap.

Referring to this drawing, 10 designates the body of the trap which may be cylindrical as shown, and which is provided upon its upper end with an inwardly offset flange or neck 11 adapted to receive thereon the depending flange of a cover 12. The cover 12 is preferably provided in its top with a reticulated panel 13 of wire meshing or the like.

The lower end of the body 10 is open, and is provided with an upwardly extending inlet in the form of a substantially conical body secured at its base portion by means of screws 14 or the like against the inner side of the body 10. The inlet, designated at 15, is open at its apex and is formed of reticulated material, such as wire meshing of the desired gage. The inlet 15 is adapted to extend substantially half-way between the upper and lower ends of the body and to admit flies and the like into the body and trap the same therein.

For the purpose of supporting the body 10 in spaced relation from the ground or other support upon which the trap may be placed, the trap is provided with a novel form of base. The base comprises a pair of strips 16 which are of greater length than the diameter of the body 10, and which are provided upon their outer ends with depending posts or spurs 17. The posts or spurs 17 are adapted to be pointed, as shown in Fig. 1, and to engage in the ground for anchoring the same thereto. The strips 16 are preferably arranged in crossed relation when set up and are provided at their intermediate portions with apertures adapted to receive therethrough a connecting bolt or pin 18. The bolt 18 is detachably secured through the strips 16 and held in position by means of a nut or the like, and also extends centrally through a bait support 19 which is mounted on the upper face of the uppermost strip 16. The bait support 19 may be in the form of a relatively shallow pan adapted to contain a liquid, a granular substance or the like for attracting the insects.

The strips 16 are provided near their outer ends with upstanding ears 20 which are spaced-apart sufficiently to receive the lower end of the body 10 therebetween. The ears 20 have their lower ends outturned to provide flanges or angled portions thereat adapted to seat upon the upper faces of the strips 16, and which are secured thereto by means of bolts 21 or the like. The upper ends of the ears 20 are apertured and are adapted to receive therethrough the outer ends of the bolts 14 for the purpose of holding the body 10 in elevated position above the strips 16 and to provide sufficient clearance between the lower end of the body 10 and the bait support 19. The lowermost strip 16 has its ears 20 preferably of slightly greater length than the ears of the top strip 16 so that the body 10 is uniformly supported at all sides above the base.

The construction of the base is such that it is of greater diameter than that of the body 10 to afford a substantial support for the body and prevent the same from tilting.

When it is desired to fold the device into compact form it is only necessary to detach the ears 20 from the body and to withdraw the bolt 18 from the strips 16. The strips 16 and the bait support 19 are now separated and are packed within the body 10 in any suitable manner. The cover 12 is removed for the introduction of the parts of the base, and is afterward placed upon the body to retain the base parts therein.

The use of the device is apparent, for when bait is placed upon the support 19, the insects are attracted to the bait, and as the light is permitted to pass through the open panel 13 and the inlet 15, the insects rise through the inlet 15 and into the body 10, thus entrapping the insects. It will be noted that the bolts 14 serve the purpose of holding the inlet 15 within the body 10, and also serve as securing means for holding the body 10 to the upper ends of the ears 20.

Various changes and modifications may be made in the details of construction of the above-specifically described embodiment of this invention without departing from the spirit thereof, and being restricted only by the scope of the following claims.

I claim:—

1. A fly trap comprising a body portion, a cover removably mounted on the body portion, an inlet mounted upon the lower end of the body portion, a pair of base strips detachably secured in crossed relation beneath the body, ears mounted upon the base strips and extending upwardly therefrom, and means for detachably connecting the ears to the lower end of the body to hold the same in elevated position.

2. In an insect trap, the combination of a body, a pair of base strips secured in crossed relation, upstanding ears carried upon the base strips near the ends thereof for engagement against the outer sides of the body, and bolts detachably securing said ears to the body to space the latter above said base strips.

3. In an insect trap, the combination of a body provided with a removable cover, a trap inlet in the bottom of the body, a pair of base strips secured in crossed relation beneath the body and extending beyond the sides thereof, a bait support secured upon the crossed portions of the base strips, prongs depending from the opposite extremities of the base strips for engagement in the ground to anchor the base thereto, and means for detachably securing the lower end of the body to said base strips.

4. In an insect trap, the combination of a body provided with a removable cover, a trap inlet in the lower end of the body, a pair of crossed base strips arranged beneath the body and provided with downturned ends adapted for engagement in the ground to anchor the base strips thereto, a bait support resting upon the crossed portions of said base strips, a detachable bolt connecting said base strips and said bait support, upstanding ears carried upon the base strips, and bolts detachably connecting the upper ends of the ears to the lower end of said body to support the same in spaced relation above said bait support.

JOSEPH JAMES LYNN.